Figure 1:
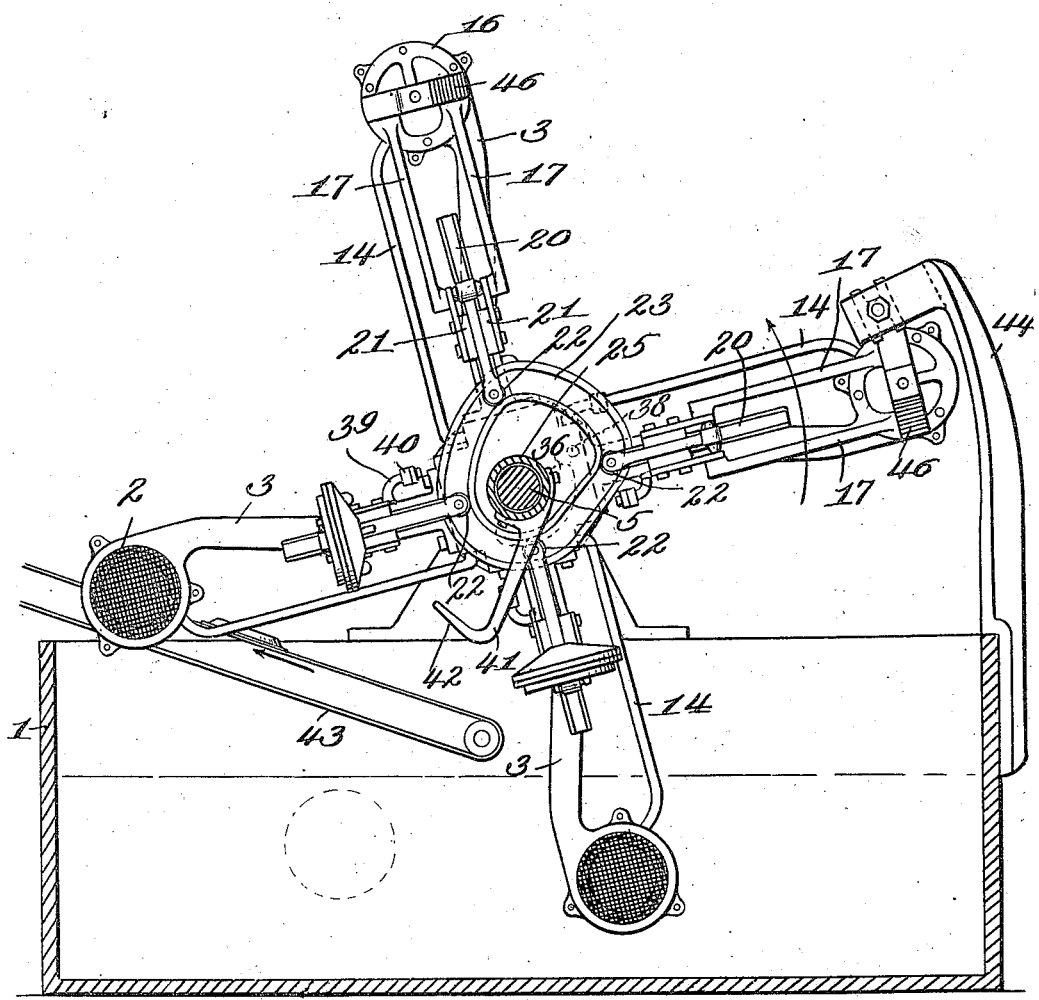

F. W. WATERMAN.
MACHINE FOR MAKING PLATES FROM PULP.
APPLICATION FILED APR. 14, 1910.

1,139,002.

Patented May 11, 1915.
4 SHEETS—SHEET 1.

Witnesses:

Inventor
Frank W. Waterman
By James L. Norris
Atty.

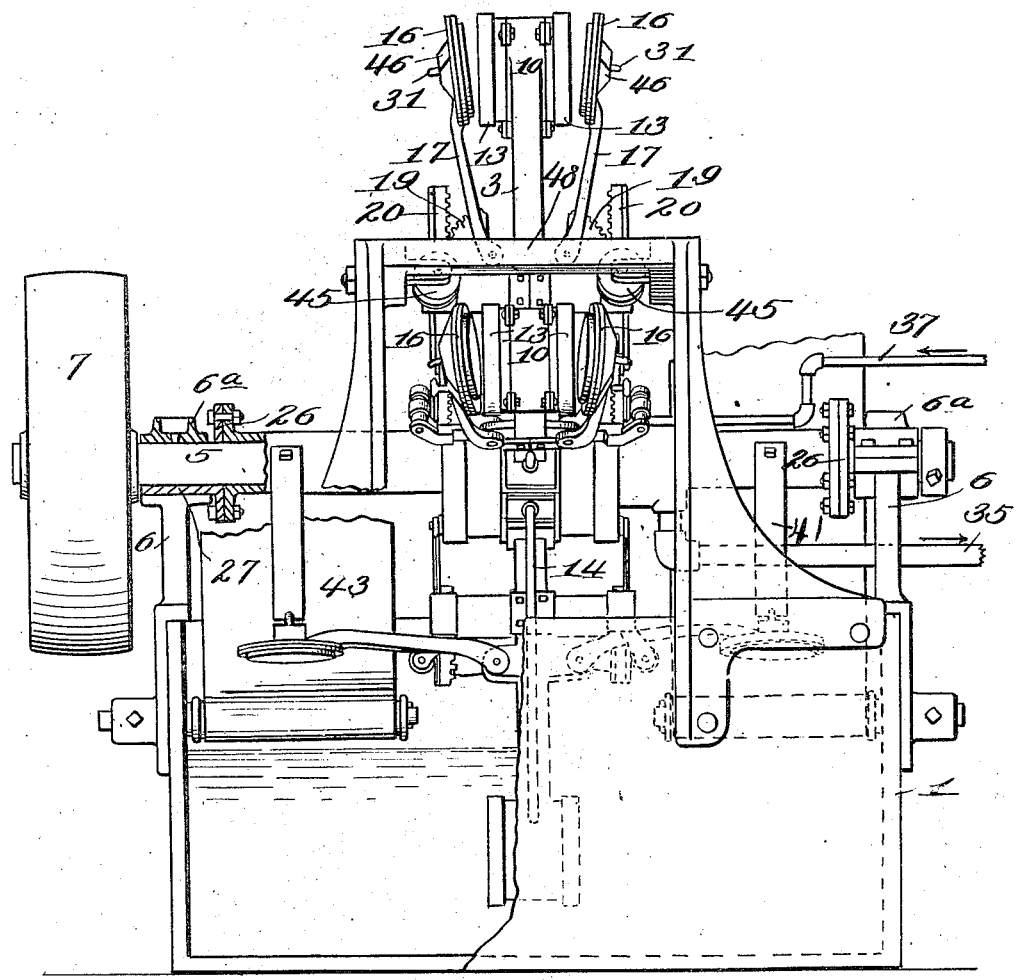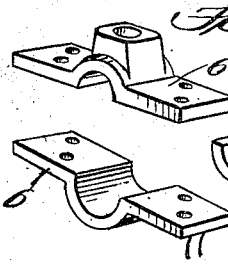

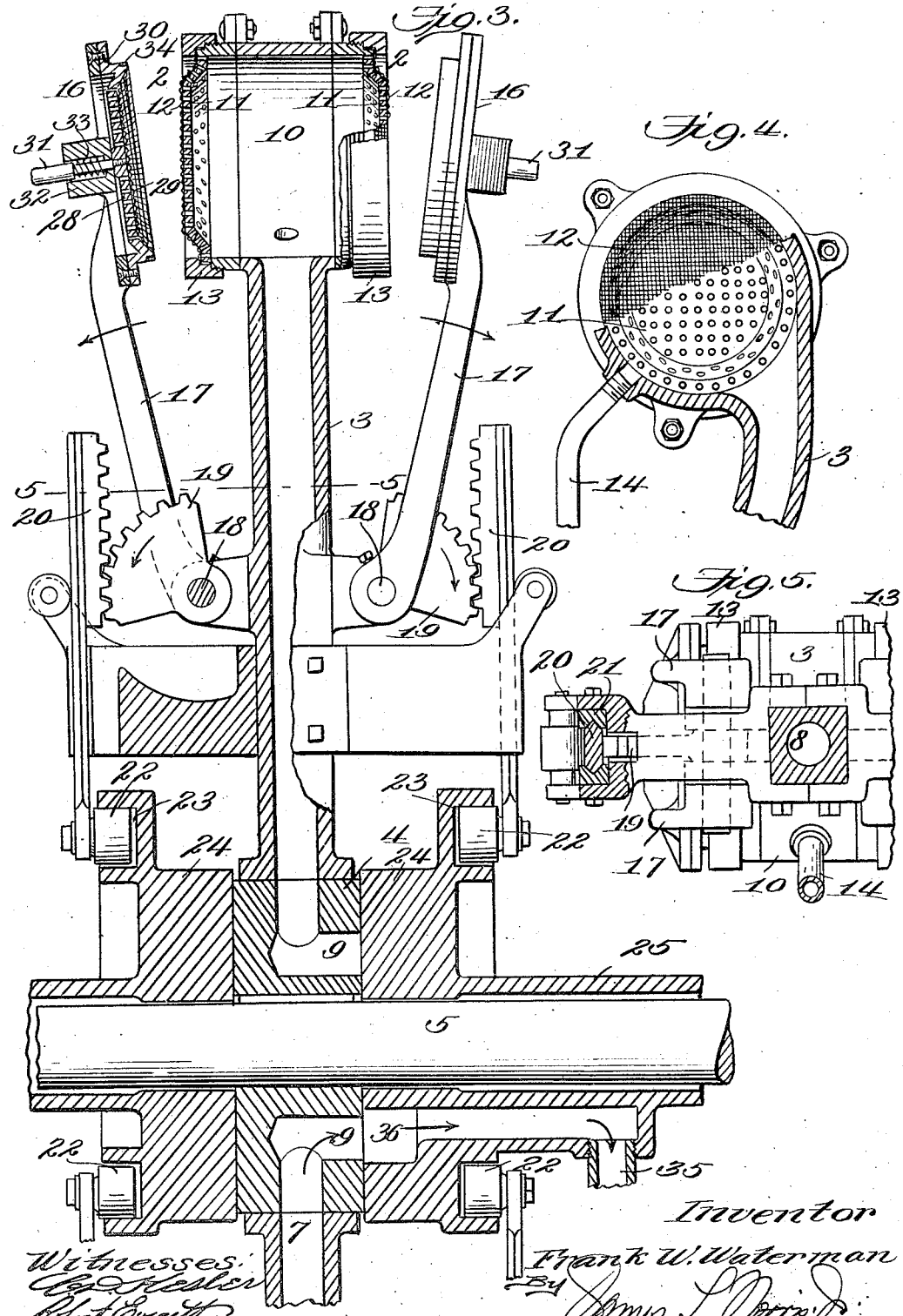

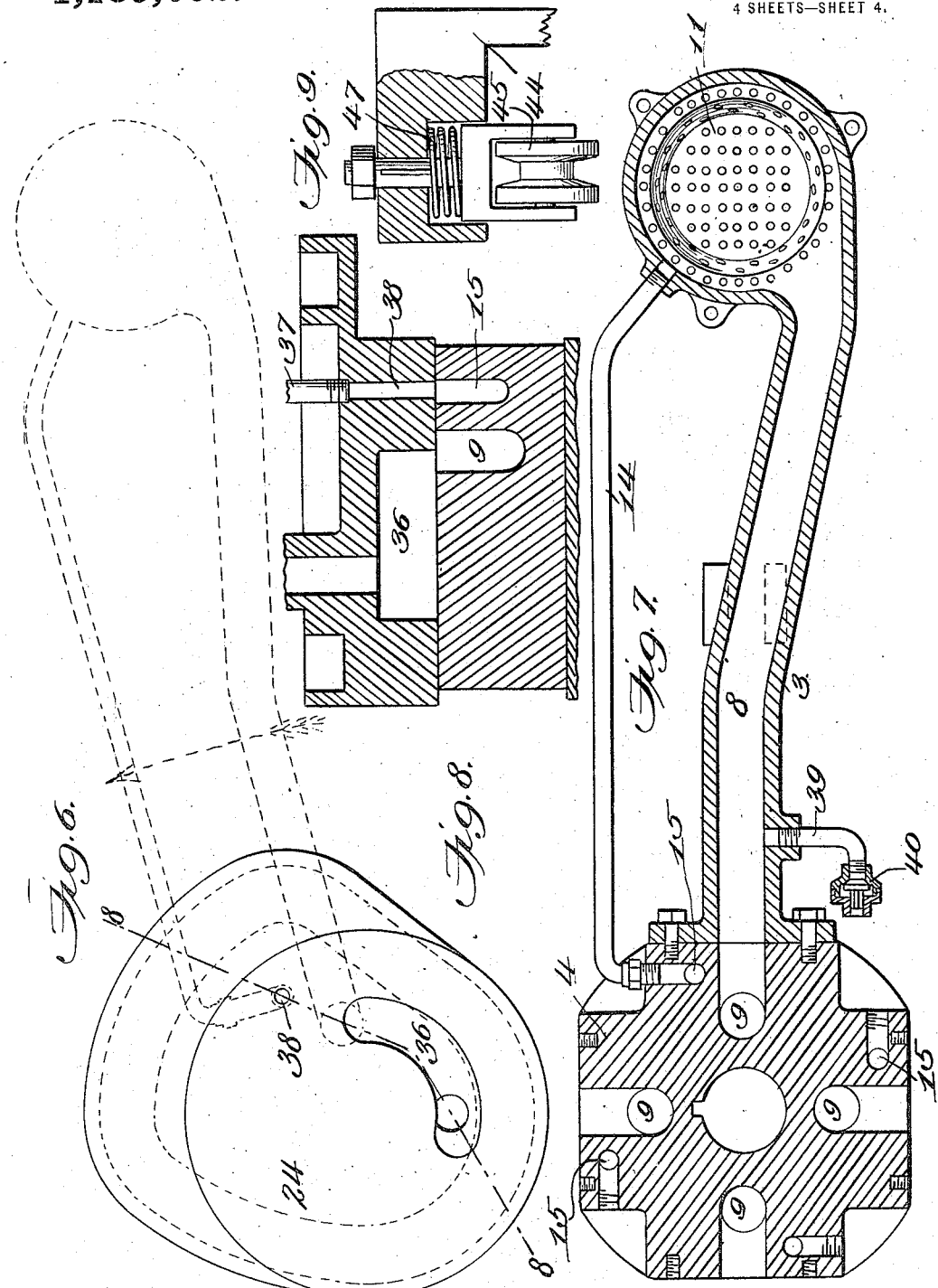

UNITED STATES PATENT OFFICE.

FRANK W. WATERMAN, OF BALTIMORE, MARYLAND.

MACHINE FOR MAKING PLATES FROM PULP.

1,139,002.

Specification of Letters Patent.

Patented May 11, 1915.

Application filed April 14, 1910. Serial No. 555,506.

*To all whom it may concern:*

Be it known that I, FRANK W. WATERMAN, a citizen of the United States, residing in Baltimore city and State of Maryland, have invented new and useful Improvements in Machines for Making Plates from Pulp, of which the following is a specification.

My present invention relates to improvements in apparatus for making plates and similar articles directly from a pulp solution, and it has for its object primarily to provide an improved machine of such class which is wholly automatic in its action and wherein the plates or other articles shall be formed uniformly and with a perfect finish or surface, especially the inner surface, in the making of paper or pulp plates, the pulp according to the present invention being deposited upon a mesh which defines the inner surface of the plate, and by the use of a complemental mold, a smooth exterior surface is given the plate and, moreover, the plate will have a homogeneous structure.

Another object of the invention is to provide in a machine of this type, means whereby the liquid part of the solution will be thoroughly removed from the mold after the formation of the plate, and any remaining moisture will be thoroughly extracted so as to facilitate the drying and hardening of the plate, means being also provided for exerting a compression upon the plate while it is interposed between a pair of molds whereby all surplus moisture will be expressed from the plate and the same will be made homogeneous.

Further objects of the invention are to provide each mold with a swinging or shiftable section which not only performs the function of compressing the pulp during the formation of the plate so as to render the plate homogeneous and to give it a smooth finish upon both sides, but such shiftable section serves as means for receiving the plates after their formation and transferring the formed plates to a belt conveyer or other suitable means for removing the completed plates from the machine, and it is also an object of the invention to improve the construction of a machine of this type in general whereby the operation of the machine is facilitated, the capacity of the machine is increased, and more perfect and uniform products are obtained.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a side elevation of a machine constructed in accordance with my present invention, the vat for the pulp solution and the shaft of the machine being shown in section for clearness in illustration; Fig. 2 represents an end elevation of the machine as shown in Fig. 1, a portion of the vat being broken away; Fig. 3 represents a central section of one of the plate-forming units of the machine, the parts being shown on an enlarged scale and the shiftable mold sections being shown in the act of receding from their complemental mold sections. Fig. 4 is a detail sectional view of one of the molds upon which the pulp is deposited; Fig. 5 represents a transverse section on the line 5—5 of Fig. 3; Fig. 6 is a diagrammatic view showing the relation of the ports for exhausting fluid successively from the plate-forming units and for introducing compressed air for the purpose of effecting a final removal of any remaining liquid or moisture from the forming mold and for transferring the formed plates from such mold to the shiftable mold sections; Fig. 7 represents a section through the revoluble hub and one of the mold-carrying arms, the section being taken in the plane of rotation thereof; Fig. 8 represents a section on the line 8—8 of Fig. 6; Fig. 9 is a detail enlarged view of one of the compression rollers; and Fig. 10 is a collective view showing in perspective the parts of one of the bearings of the machine.

Similar parts are designated by the same reference characters in the several views.

In the accompanying drawing, I have shown an automatically operating machine which is adapted to make plates and similar receptacles or articles direct from a pulp solution. It will be understood, however, that certain features of the invention are not necessarily limited to the manufacture of articles of such specific shape and, moreover, certain modifications and changes may be made in the relative arrangement or the detail construction of the parts according to the circumstances and conditions under which the machine is to operate.

In the present instance, 1 designates a vat or receptacle adapted to receive and contain a pulp solution and above the vat are suitably mounted the various operating parts of the machine. In the present instance, the pulp solution is received successively by a set or series of mold sections which are arranged in radiating relation and revolve about an axis placed above the solution. In that form of the invention shown, a set of four mold sections 2 are provided, these mold sections being carried by a corresponding number of rigid supporting arms 3 and such arms are suitably attached in rigid relation to a central hub 4, the latter being keyed or rigidly mounted upon a supporting shaft 5. The shaft 5 is journaled upon bearing standards 6 which in the present instance are shown attached to the walls of the vat. Any suitable means may be provided for imparting rotating movement to the mold sections and their supporting arms, a pulley 7 being attached to the shaft 5 in the present instance to accomplish such purpose.

Each mold-supporting arm 3 is hollow so as to form a suction passage 8, the suction passage 8 of each mold-supporting arm communicating with a corresponding axial port 9 which is formed in the hub 4 and opens at one side thereof as shown in Fig. 3. As previously stated, the molds in that form of the machine shown are adapted to form plates or receptacles of a similar nature. In order to provide a machine of maximum capacity, I construct a chamber 10 upon the outer end of each mold-supporting arm 3 which chamber serves as a common suction space for a pair of reversely arranged mold sections 2. Each of these mold sections is composed of a perforated plate 11 and a wire screen or mesh 12 which is applied over the exterior of this perforated plate and may be secured in proper relation thereto by any suitable means such, for instance, as by the retaining ring or cap 13 which ring or cap may be conveniently threaded upon the exterior of the chamber 10. The pulp solution is drawn toward this mesh 12 by reason of the suction in the chamber 10 and the pulp will therefore be deposited upon this mesh. Practice has demonstrated that a very smooth surface will be formed upon that portion of the plate which is first deposited upon the mesh. In order that the inner surface of the plate may be smooth, I dish the perforated plate 11 and the mesh 12 so as to present its convex side to the pulp solution. The hollow supporting arm 3, according to the present invention, communicates with the suction chamber 10 at a tangent and it connects with that part of the chamber 10 which forms the under side, while the respective mold is leaving the pulp solution, this formation giving the arm 3 a downward offset which will serve to catch and thoroughly remove all of the liquid contained in the suction chamber of the mold. A compressed air supply pipe 14 also communicates with the suction chamber 10 at a point approximately opposite to the point at which the suction passage 8 communicates with such chamber, the opposite end of this compressed air supply pipe being attached to the hub 4 and communicating with a port 15 formed in such hub, the pipe 14 being arranged exteriorly of the mold-supporting arm 3.

A pair of shiftable mold sections 16 are mounted in coöperative relation with each of the mold sections 2, these shiftable mold sections performing the functions of compressing and completing the formation of the plates and of subsequently receiving the formed plates and transferring them to conveyers or other divices for removing the plates from the machine. In the present instance, the shiftable mold sections and their operating devices are duplicates, each having a supporting arm 17 which is pivoted at 18 to an appropriate fixed bearing on the arm 3, and a segmental gear 19 is operatively connected to each arm 17 and coöperates with a reciprocatory rack 20. Each rack 20 is slidable in a guide 21 rigidly supported on the arm 3 and it carries a roller or projection 22 which follows a cam track 23 of appropriate form. In the present instance, the cam tracks 23 are formed in a pair of cam disks 24 which are arranged upon opposite sides of the central hub 4 and form a fluid-tight joint therewith. The cam disks 24, however, are stationary while the hub 4 is revoluble between them. Any suitable means may be provided for rigidly mounting the cam disks 24 in coöperative relation with the mold carrier, each disk in the present instance being provided with a sleeve 25 which loosely surrounds the shaft 5 and is coupled at its outer end to an anchoring device 26 which may be of any suitable form. In the present instance, this anchoring device has a segmental bushing section 27 which is adapted to fit into the lower half of the bearing 6 and to receive the shaft 5, and the bearing 6ª when applied to the bearing 6 will rest upon the diagrammatically opposite edges of the bushing 27 and thereby lock the same from rotation.

The shiftable mold sections 16 are substantial counterparts of the mold sections 2, each section 16 embodying a perforated plate 28 which is dished so as to present its concave side toward the opposed convex side of the mold section 2, and a wire mesh 29 is applied to the face of the perforated plate 28. According to the present invention, suitable means is provided for ejecting a formed plate from the shiftable mold sections 16, the perforated plate 28 in the present instance being formed separately from the frame 30 whereby such perforated plate may move inwardly, and an ejecting plunger 31 is attached to the center of the perforated plate, this plunger being guided in a socket 32 formed as a rigid part of the frame 30 of this mold section, and a compression spring 33 normally acts upon the plunger and tends to hold the latter in retracted position. The wire mesh 29 is so applied to the face of the perforated plate 28 as to permit the latter to be operated by the ejecting plunger. In order to form the plates with a sharply defined, smooth rim of uniform thickness and strength, a part of the shiftable mold section coöperates with a corresponding part of the mold section 2 as a shear to trim off any surplus pulp that may accumulate beyond the edge of the molding surface. In the present instance, a ring 34 is employed to secure the wire mesh 29 to the shiftable mold section and this ring 34 is of a size sufficient to snugly fit into the ring 13 of the mold section 2 when the molds are brought together to compress the interposed molded pulp. When the ring 34 enters the ring 13, it will shear off any pulp that may have accumulated adjacent to the ring 13 and, moreover, it will compress the edge of the molded pulp.

During the operation of the machine, a suction action is produced in the chamber 10 of each mold as the respective chamber is carried through the pulp solution. An exhaust pump or other suitable means may be provided for maintaining a partial vacuum of appropriate degree and for this purpose, the exhaust pump is connected to the pipe 35 which pipe in turn communicates with an exhaust channel 36 which is formed in that face of the right hand cam disk 24 in Fig. 3 which is adjacent to the ported side of the hub 4. This exhaust channel 36 has such a position and is of such a length as to cause a sufficient quantity of the pulp to be deposited upon the wire mesh surfaces 12 upon each mold as the same is carried through the pulp solution. Compressed air for the supply pipes 14 leading to the mold chambers 10 is supplied to the machine from a compressor by a pipe 37 which communicates with a port 38 formed in one of the disks 24. The port 38 and the exhaust channel 36 are formed, however, at different distances from the center of the disk 24 in order that the channel 36 may communicate successively and solely with the ports 9 of the hub 4 while the compressed air supply port 38 may communicate solely and successively with the compressed air supply ports 15 in the hub, the compressed air supply port 38 being placed in such a position with respect to the ports 15 that a charge of compressed air will be admitted to the chamber 10 a moment before the suction passage 9 has been cut off from the exhaust channel 36 whereby such charge of compressed air will serve to forcibly eject any remaining trace of liquid that may be contained in the chamber 10 or the passage 8. As an additional precaution, an auxiliary vent 39 may be provided whereby any surplus liquid in the passage 8 may immediately and directly escape to the atmosphere, this vent including a check-valve 40 which will be automatically inserted so as to open the vent by gravity as the respective mold-supporting arm leaves the solution, and before such arm again enters the solution, this check-valve will close so as not to interfere with the suction action. Before each mold-carrying arm again enters the solution, the ejecting plunger 31 upon the shiftable mold section is acted upon by an ejector 41, one of which is fixed to each of the sleeves 25 and embodies an inclined cam surface 42 which presses upon the respective ejecting plunger. A conveyer 43 is mounted beneath each ejector and in a position to receive the plates as they are ejected from the shiftable mold sections, and these conveyers remove the plates automatically from the machine.

The present invention also provides means for compressing the formed plate between the opposed mold sections to render the plate homogeneous and to extract all surplus moisture and thus facilitate drying of the plates, a stationary compression frame 44 being provided which is equipped with a pair of opposed grooved compression rollers 45, and such rollers are adapted to ride upon the inclined surfaces 46 at the outer sides of the shiftable mold sections, the grooves in the rollers straddling the ejecting plungers. In the present instance, the rollers are yieldingly pressed toward each other by the compression springs 47, and the frame is connected by a tie member 48 which prevents springing of the frame under the compressing action of the rollers.

In operation, the vat contains a suitable pulp solution, and rotary motion is imparted to the mold-carrying arms. Just after the mold at the end of each arm dips into the pulp solution, a suction action is created within such mold by the port 9 for this mold coming into communication with the exhausting channel 36, and such communication is maintained until the respective mold enters between the compression rollers. While the mold is passing through the solution, the cams 33 will hold the shiftable mold sections in positions approximately at right angles to the mold sections 2, and the latter will receive upon their mesh surfaces, a deposit of pulp in the form of a layer conforming to the shape of the plate. As the mold leaves the solution, the cams will carry the shiftable mold sections toward the complemental mold sections, the suction during this time being maintained so as to empty the suction chamber of the mold and its passages of liquid, and as the continued rotation of the mold-supporting arm carries the closed mold sections between the compression rollers, the latter exert a sufficient pressure upon the molded pulp to produce a smooth exterior surface thereon, to render the plate homogeneous, and to express all surplus liquid. Just after such compression, a supply of compressed air is admitted to the mold through the ports 15, 38 and the pipe 14, the initial admission of the compressed air occurring just before the suction communication is cut off, whereby any liquid or moisture remaining in the mold or its passages shall be blown out, the suction communication being cut off immediately thereafter and the compressed air continues to act upon the mold after the same has left the compression rollers and the cams start to open the shiftable mold sections, the compressed air supply being thereupon immediately cut off. This supply of compressed air acts on the formed plate to remove it from the mold section 2 and to transfer it to the shiftable mold section, the latter upon the continued rotation of the mold moving into an approximately longitudinal position, and a further rotation of the mold brings the ejecting plunger of the shiftable mold section into engagement with the ejector, the latter thereupon ejecting the formed plate and causing it to drop upon the conveyer by which it is removed from the machine.

I claim as my invention:

1. In a machine of the class described, the combination of a vat to contain a pulp solution, a rotatable carrier supporting a mold section upon which the pulp is to be deposited, means for producing a suction action upon said mold section, a shiftable mold section adapted to compress a plate formed upon the mold section first mentioned and forming a receiver for the plate, means for swinging said shiftable mold section from a position to receive a plate to a position to eject the same, an ejector carried by said shiftable mold section, and means for positively and mechanically actuating said ejector to remove the plate when the shiftable mold section is in ejecting position.

2. In a machine of the class described, the combination of a vat to contain a pulp solution, a rotating carrier provided with a mold section upon which the pulp is adapted to be deposited, a hinged mold section having means for swinging it into engagement with a plate formed upon the mold section first mentioned and for swinging it into position to eject the plate therefrom, means for creating a suction action upon the mold section first mentioned, means for admitting compressed air to the mold section first mentioned to transfer a formed plate therefrom to the shiftable mold section, a mechanical ejector carried by the shiftable mold section, and means for actuating said ejector to remove the plate therefrom.

3. In a machine of the class described, the combination of a vat to contain a pulp solution, a rotating carrier supporting a mold section, means for creating a suction action upon said mold section, means for admitting a supply of compressed air to said mold section a moment before the interruption of said suction action, a hinged mold section adapted to swing into a position to coöperate with the mold section first mentioned and to swing into ejecting position, means for producing a compression upon the mold sections, the hinged mold section being adapted to receive the formed plate from the mold section first mentioned and to swing into ejecting position, an ejector movably carried by the hinged mold section, and a device arranged in the path of said ejector for actuating the latter to remove the plate from the hinged mold section while the latter is in ejecting position.

4. In a machine of the class described, the combination of a vat to contain a pulp solution, a traveling carrier supporting a mold section provided with a mesh upon which the pulp is adapted to be deposited, and a separately formed ring surrounding said mesh and securing the same in position, means for creating a suction action upon said mold section, and a shiftable mold section also having a mesh to coöperate with the formed plate and also having a separately formed ring which secures the mesh of the shiftable mold section in position and coöperates with the ring of the section first mentioned as a shear to trim the edge of the formed plate.

5. In a machine of the class described, the combination of a rotatable carrier provided with a mold-supporting arm and a mold thereon, the mold-supporting arm having a suction passage which communicates tangentially with the interior of said mold and said arm being bodily offset circumferentially with respect to the mold so as to form a collecting space for the liquid flowing from the mold, a compressed air supply pipe located exteriorly of said arm and communicating with the mold section at a point approximately opposite to and directed toward the point of connection between the mold section and its supporting arm, means for creating a suction action upon said mold section, means for subsequently admitting compressed air to said compressed air supply pipe leading to the mold section, and a shiftable complemental mold section arranged to coöperate with the mold section first mentioned.

In testimony whereof I have hereunto set my hand in presence of two subscribing witnesses.

FRANK W. WATERMAN.

Witnesses:
   CHAS. S. HYER,
   CLARENCE A. BATEMAN.